(12) United States Patent
Pham et al.

(10) Patent No.: US 12,086,210 B2
(45) Date of Patent: Sep. 10, 2024

(54) STATE DETERMINATION APPARATUS AND IMAGE ANALYSIS APPARATUS

(71) Applicant: KABUSHIKI KAISHA TOSHIBA, Tokyo (JP)

(72) Inventors: Quoc Viet Pham, Yokohama Kanagawa (JP); Toshiaki Nakasu, Chofu Tokyo (JP); Nao Mishima, Inagi Tokyo (JP); Shojun Nakayama, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 302 days.

(21) Appl. No.: 17/460,387

(22) Filed: Aug. 30, 2021

(65) Prior Publication Data

US 2022/0129693 A1 Apr. 28, 2022

(30) Foreign Application Priority Data

Oct. 28, 2020 (JP) .................. 2020-180756

(51) Int. Cl.
*G06F 18/22* (2023.01)
*G06T 7/11* (2017.01)
(Continued)

(52) U.S. Cl.
CPC .............. *G06F 18/22* (2023.01); *G06T 7/11* (2017.01); *G06V 10/22* (2022.01); *G06V 30/40* (2022.01); *G06T 2207/20084* (2013.01)

(58) Field of Classification Search
CPC ...... G06F 18/22; G06F 18/213; G06F 18/253; G06F 40/30; G06T 7/11;
(Continued)

(56) References Cited

U.S. PATENT DOCUMENTS 11,314,800 B2 * 4/2022 Huang ................ G06F 16/5854
11,386,667 B2 * 7/2022 Latapie .................. G06V 20/52
(Continued)

FOREIGN PATENT DOCUMENTS

| CN | 106485224 A | * 3/2017 | ......... G06K 9/00845 |
|---|---|---|---|
| CN | 115132228 A | * 9/2022 | |
| JP | 2017091525 A | 5/2017 | |

OTHER PUBLICATIONS

Anderson, P. "Bottom-Up and Top-Down Attention for Image Captioning and Visual Question Answering" Computer Vision and Pattern Recognition; Jul. 25, 2017, pp. 1-15. (Year: 2017).*
(Continued)

*Primary Examiner* — Mia M Thomas
(74) *Attorney, Agent, or Firm* — Holtz, Holtz & Volek PC

(57) ABSTRACT

According to one embodiment, a state determination apparatus includes a processor. The processor acquires a targeted image. The processor acquires a question concerning the targeted image and an expected answer to the question. The processor generates an estimated answer estimated with respect to the question concerning the targeted image using a trained model trained to estimate an answer based on a question concerning an image. The processor determines a state of a target for determination in accordance with a similarity between the expected answer and the estimated answer.

16 Claims, 12 Drawing Sheets

(51) Int. Cl.
*G06V 10/22* (2022.01)
*G06V 30/40* (2022.01)

(58) Field of Classification Search
CPC .......... G06T 2207/20084; G06V 10/22; G06V 30/40; G06V 10/26; G06V 10/454; G06V 10/761; G06V 10/806; G06V 10/25
See application file for complete search history.

(56) References Cited

U.S. PATENT DOCUMENTS

| | | | | |
|---|---|---|---|---|
| 11,582,485 | B1* | 2/2023 | Cherian | G06V 10/86 |
| 11,768,876 | B2* | 9/2023 | Qin | G06N 3/088 |
| | | | | 382/103 |
| 2016/0351031 | A1* | 12/2016 | Jo | G08B 13/19615 |
| 2017/0124432 | A1* | 5/2017 | Chen | G06N 5/04 |
| 2017/0202453 | A1* | 7/2017 | Sekiguchi | G06T 11/003 |
| 2019/0026682 | A1* | 1/2019 | Ike | G06Q 10/06313 |
| 2019/0045207 | A1* | 2/2019 | Chen | G06N 3/04 |
| 2019/0272334 | A1* | 9/2019 | Yasuoka | G06F 16/435 |
| 2020/0380358 | A1* | 12/2020 | Kemertas | G06F 16/23 |
| 2020/0410989 | A1* | 12/2020 | Ray | G06F 40/216 |
| 2021/0090277 | A1* | 3/2021 | Guizilini | G06N 3/08 |
| 2021/0200852 | A1* | 7/2021 | Gupta | G06F 21/33 |
| 2022/0005332 | A1* | 1/2022 | Metzler | G06F 18/2431 |
| 2022/0083769 | A1* | 3/2022 | Nakayama | G06T 7/73 |
| 2022/0215411 | A1* | 7/2022 | Shinoda | G06Q 10/04 |
| 2023/0077031 | A1* | 3/2023 | Hosoya | G06V 10/806 |
| 2023/0245435 | A1* | 8/2023 | Zhao | G06V 10/806 |
| | | | | 382/176 |

OTHER PUBLICATIONS

Wu, Q. et al. "Image Captioning and Visual Question Answering Based on Attributes and External Knowledge" IEEE Transactions on Pattern Analysis and Machine Intelligence, vol. 40, No. 6, Jun. 2018 (Year: 2018).*

Li, et al., "Relation-Aware Graph Attention Network for Visual Question Answering", ICCV 2019.

Long, et al., "Fully Convolutional Networks for Semantic Segmentation", CVPR, 2015.

Ren, et al., "Faster R-CNN: Towards Real-Time Object Detection with Region Proposal Networks", Neural Information Processing Systems (NIPS}, 2015.

* cited by examiner

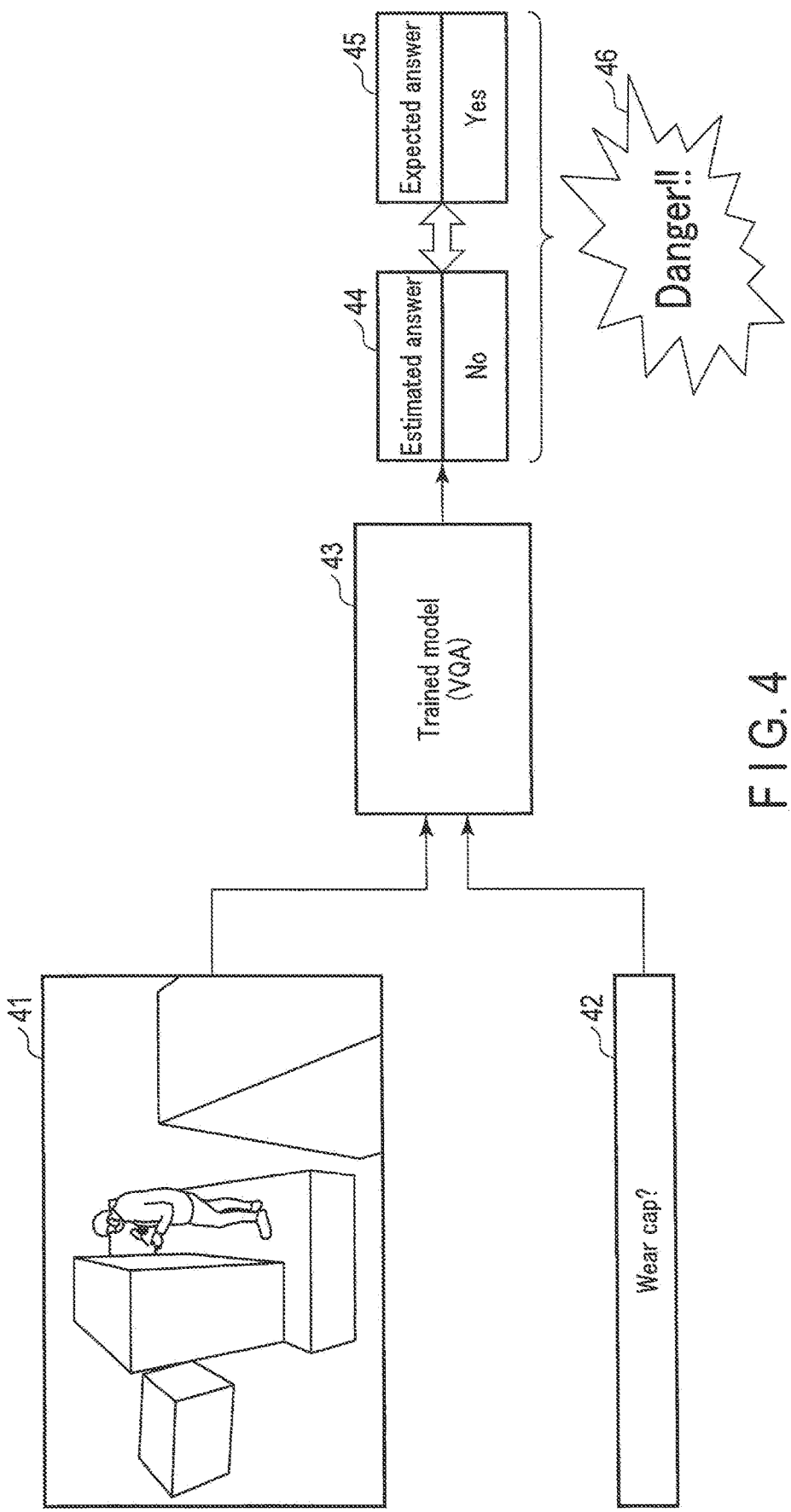
F I G. 4

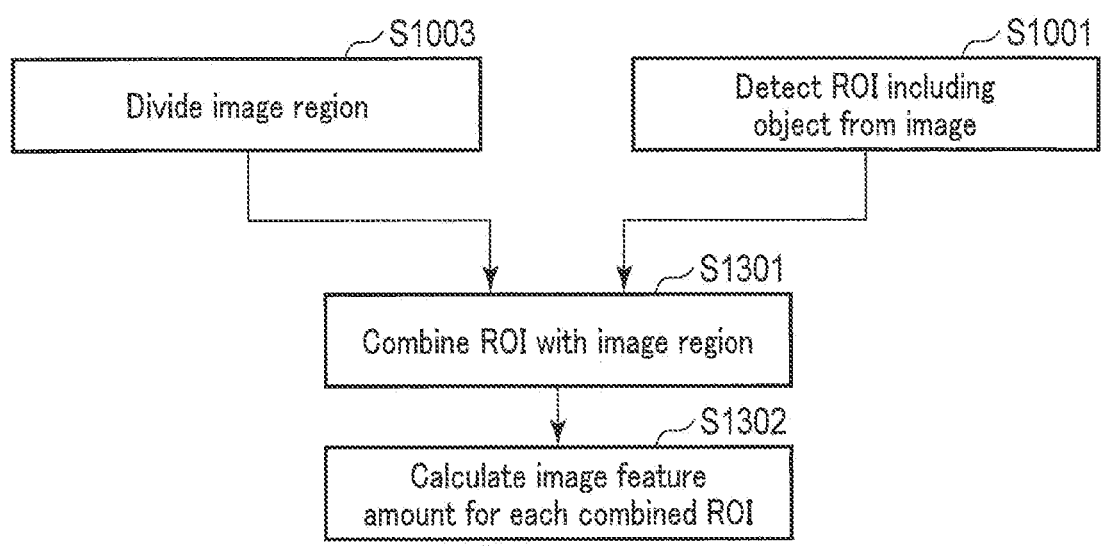
F I G. 13

STATE DETERMINATION APPARATUS AND IMAGE ANALYSIS APPARATUS

CROSS-REFERENCE TO RELATED APPLICATIONS

This application is based upon and claims the benefit of priority from Japanese Patent Application No. 2020-180756, filed Oct. 28, 2020, the entire contents of which are incorporated herein by reference.

FIELD

Embodiments described herein relate generally to a state determination apparatus and an image analysis apparatus.

BACKGROUND

There is a need for detecting an equipment state or a dangerous state, for example, not conforming to a safety manual, based on a site image captured by a camera located in a manufacturing site or a maintenance site.

BRIEF DESCRIPTION OF THE DRAWINGS

FIG. 4 is a conceptual diagram showing an example of application of the state determination process of the state determination apparatus.

FIG. 13 is a flowchart showing a second example of the image feature amount calculation process.

DETAILED DESCRIPTION

In general, according to one embodiment, a state determination apparatus includes a processor. The processor acquires a targeted image. The processor acquires a question concerning the targeted image and an expected answer to the question. The processor generates an estimated answer estimated with respect to the question concerning the targeted image using a trained model trained to estimate an answer based on a question concerning an image. The processor determines a state of a target for determination in accordance with a similarity between the expected answer and the estimated answer.

In the following, a state determination apparatus and an image analysis apparatus according to the embodiments will be described in detail with reference to the drawings. In the embodiments described below, elements assigned the same reference symbols are assumed to perform the same operations, and redundant descriptions thereof will be omitted as appropriate.

First Embodiment

Figure 1:
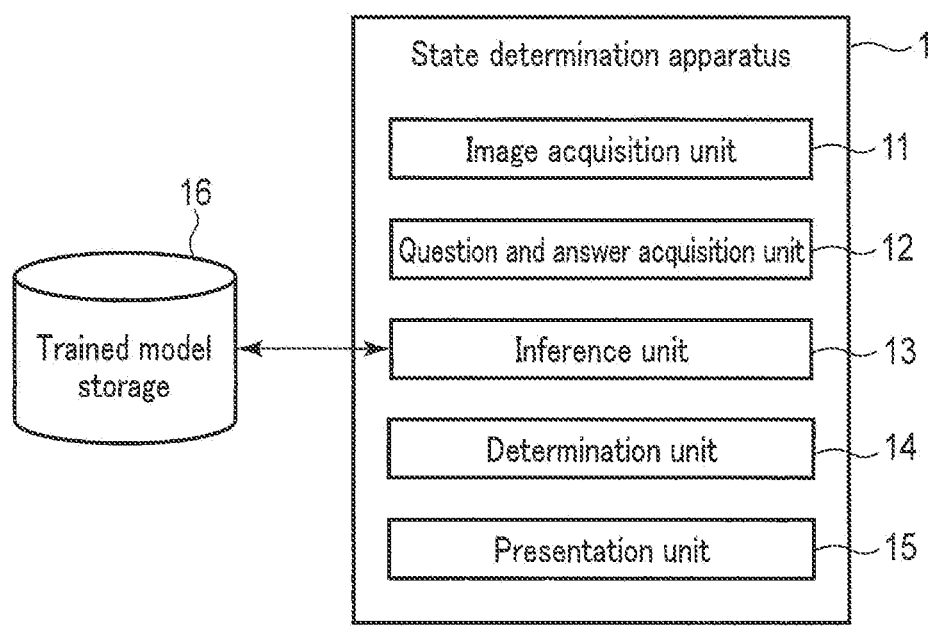
FIG. 1 is a block diagram showing a state determination apparatus according to a first embodiment.

An example of a state determination apparatus according to the first embodiment will be explained with reference to the functional block diagram of FIG. 1.

A state determination apparatus 1 of the first embodiment includes an image acquisition unit 11, a question and answer acquisition unit 12, an inference unit 13, a determination unit 14, and a presentation unit 15.

The image acquisition unit 11 acquires a targeted image.

The question and answer acquisition unit 12 acquires a question concerning the targeted image and an expected answer to the question.

The inference unit 13 generates an estimated answer to the question concerning the targeted image using a trained model trained to estimate an answer based on a question concerning an image. The trained model assumed in the first embodiment is a model relating to so-called visual question answering (VQA), which derives an answer from an input image, when the input image and a question concerning the input image are presented. For example, the trained model is stored in, for example, a trained model storage 16. The trained model storage 16 may be externally present, for example, in a cloud server, or may be present inside the state determination apparatus 1. When the inference unit 13 refers to the external trained model storage 16, it suffices to transmit a question to the trained model storage 16 and receive an estimated answer.

The determination unit 14 determines a state of a target for determination in accordance with a similarity between the expected answer and the estimated answer. For example, the determination unit 14 determines whether the target for determination is in an anomaly state or not. The anomaly state in the embodiments is, for example, a dangerous state, a harsh state, or the like, which is different from the state expected by the expected answer.

When the determination unit 14 determines that, for example, the state of the target for determination is anomaly, the presentation unit 15 notifies that the state is anomaly. The presentation unit 15 refers to a database, and presents a solution or a remedial measure.

Next, a state determination process of the state determination apparatus 1 according to the first embodiment will be described with reference to the flowchart of FIG. 2.

In step S201, the image acquisition unit 11 acquires a targeted image. According to the first embodiment, the targeted image is assumed to be a photographed image obtained by photographing a worker as the target for determination through a monitoring camera or the like.

However, the targeted image is not limited to a photographed image, and may be any image that is available to determine a state of the target for determination. The image is not limited to a still image and may be a moving image.

In the case of a moving image, the state determination process by the state determination apparatus 1 may be performed for each frame, or for a representative frame selected from a plurality of frames.

In step S202, the question and answer acquisition unit 12 acquires a question concerning the targeted image and an expected answer to the question. In the first embodiment, it is assumed that whether preparation or work is performed in accordance with a safety manual is determined. Therefore, questions and expected answers are prepared in advance based on the safety manual. In other words, the expected answers are prepared on the assumption of normal states.

In step S203, the inference unit 13 generates an estimated answer to a question concerning the targeted image using the trained model relating to VQA.

In step S204, the determination unit 14 compares the estimated answer with the expected answer, and determines whether or not the similarity between the answers is equal to or greater than a threshold value. If the similarity is equal to or greater than the threshold value, the flow proceeds to step S205, and if the similarity is smaller than the threshold value, the flow proceeds to step S206.

The determination of the similarity in the determination unit 14 varies depending on an output format of the estimated answer and the expected answer. For example, if the output format of the estimated answer and the expected answer is a numerical value, the determination unit determines that the estimated answer and the expected answer are similar when the difference between the answers is zero or smaller than the threshold value. If the output format of the estimated answer and the expected answer is a character string, such as a noun or a sentence, for example, a cosine similarity between an estimated answer 44 and an expected answer 45 is calculated, so that a fluctuation of description or a difference in wording can be absorbed. The estimated answer and the expected answer can be determined to be similar if the cosine similarity is equal to or greater than a threshold value. In this manner, a semantic similarity can be determined.

In step S205, since it is considered that the estimated answer conforms to the expected answer, the determination unit 14 determines that the worker as the target for determination is in a state that complies with the safety manual, in other words, determines that there is nothing anomalous.

In step S206, since it is considered that the estimated answer does not conform to the expected answer, the determination unit 14 determines that the worker as the target for determination is not in a state that complies with the safety manual, in other words, determines that there is something anomalous.

Figures 2, 3:
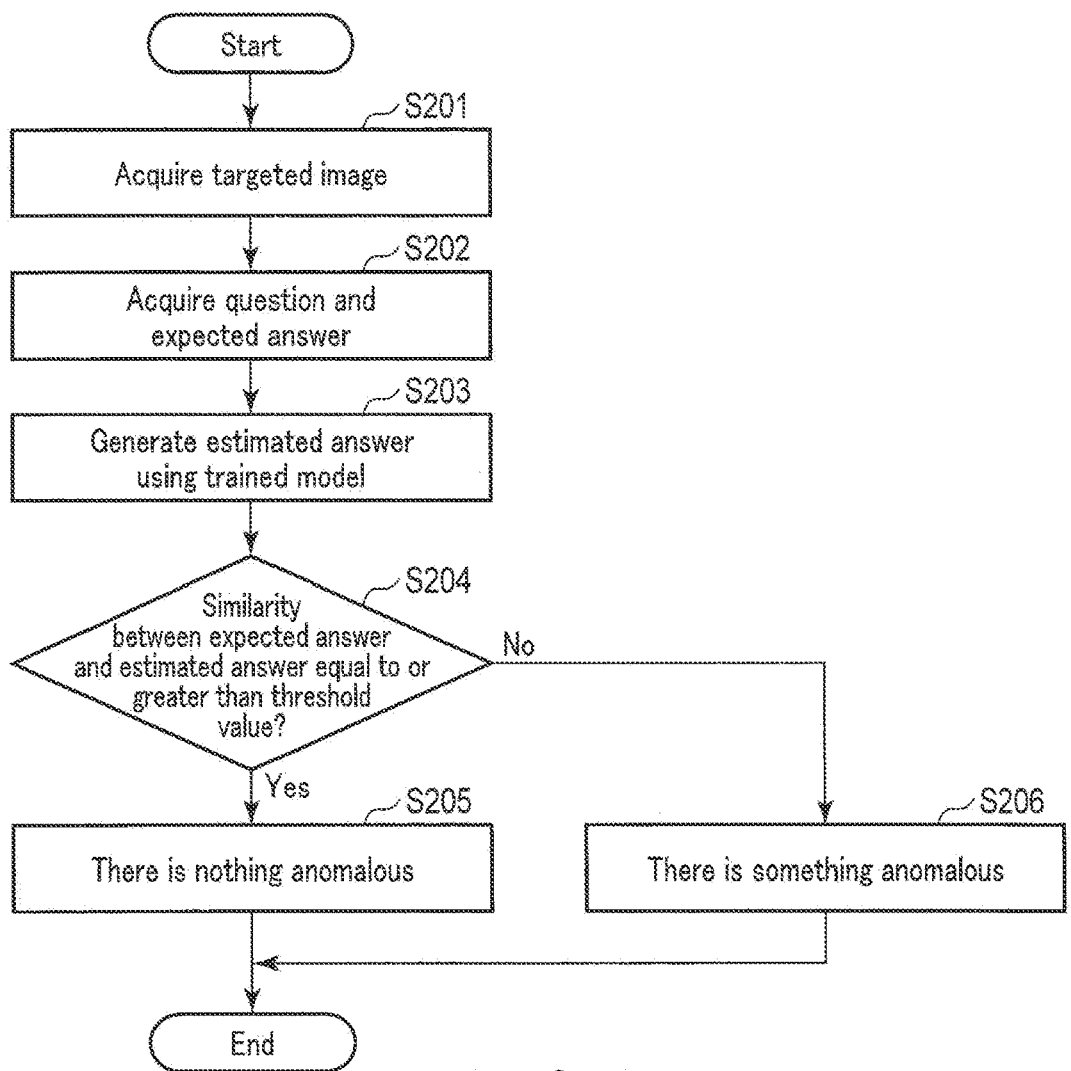
FIG. 2 is a flowchart showing a state determination process of the state determination apparatus according to the first embodiment.
FIG. 3 is a table showing an example of questions and expected answers.

In the example of FIG. 2, the expected answers are prepared on the assumption of normal states. However, depending on the way to prepare questions and answers, the determination results (step S205 and step S206) in the determination unit 14 are exchanged. For example, if the question and answer acquisition unit 12 acquires a set of a question and an answer on the assumption of anomaly states, the determination unit 14 determines that the estimated answer conforms to the expected answer, that is, there is something anomalous, if the similarity between the expected answer and the estimated answer is equal to or greater than the threshold value in step S204.

Next, an example of questions and expected answers acquired by the question and answer acquisition unit 12 will be described with reference to FIG. 3.

FIG. 3 is an example of a table storing questions and expected answers in association with each other. The table shows a preparation list for a safe state (there is nothing anomalous) prescribed in the safety manual that the worker should comply with. Specifically, the question "Wear a cap?" and the expected answer "Yes" are associated and stored in the table.

The question and answer acquisition unit 12 sequentially extracts a set of a question and an expected answer from the table shown in FIG. 3, so that a process by the inference unit 13 and the determination unit 14 is executed. The storage format of the questions and the expected answers is not limited to a table format, and may be of any format as long as a question and an expected answer can be extracted as a set.

An example of application of the state determination process of the state determination apparatus 1 will now be described with reference to FIGS. 3 and 4. FIG. 4 is a conceptual diagram showing processes in the inference unit 13 and the determination unit 14.

The inference unit 13 inputs a targeted image 41 and a question 42 to a trained model 43 for VQA, and an estimated answer 44 is output as a result of inference from the trained model 43. In the example shown in FIG. 4, the image of the operating worker is input as the targeted image 41, and the question 42 "Wear a cap?" shown in FIG. 3 is input to the trained model 43. In the trained model 43, an image feature amount is extracted from the targeted image 41 and a text feature amount is extracted from the question 42, and an answer to the question is inferred based on the image feature amount and the text feature amount. In this example, it is assumed that the estimated answer 44 "No" is output from the trained model 43.

Since the expected answer 45 with respect to the question 42 "Wear a cap?" is "Yes" in the table shown in FIG. 3, the determination unit 14 compares the expected answer 45 with the estimated answer 44. Here, the determination unit 14 compares the answers in terms of semantic similarity. Since the estimated answer 44 "No" and the expected answer 45 "Yes" are opposite, the determination unit 14 determines that the similarity between the estimated answer 45 and the expected answer 44 is smaller than the threshold value. Thus, since the estimated answer 45 and the expected answer 44 are different, a determination result 46 indicative of an anomaly state, in this example, a dangerous state, is generated.

An example of presentation of a detection result indicative of a dangerous state by the presentation unit 15 will now be described with reference to FIG. 5.

Figure 5:
FIG. 5 is a diagram of an example of presentation of a result of detecting a dangerous state.

FIG. 5 is, for example, a user interface screen displayed on, for example, a display device. The presentation unit 15 adds estimated answers to the table of the questions and the expected answers shown in FIG. 3, and displays the table in the user interface screen.

In this example, the expected answer to the question Q2 "Wear gloves?" is "Yes", whereas the estimated answer made by the inference unit 13 is "No". Therefore, a mark 51 indicative of a dangerous state is displayed. Instead of displaying the mark 51, the character string of the estimated answer may be emphasized with a color, a character size, highlight, blinking, etc. Alternatively, a dangerous state may be notified with a voice, an alarm sound, or the like. Thus, the user can ascertain at once what item is in a dangerous state by observing the screen.

In addition, with regard to the item determined to be dangerous, a solution or a remedial measure in a past case may be displayed in an item "Solution or remedial measure" of the table shown in FIG. 5. In this example, since the requirement is not satisfied for the item of the question Q2

"Wear gloves?", it is possible to present a solution, for example, "Wear spare gloves on a back shelf".

In the first embodiment described above, the state of the target for determination can be determined by using the trained model relating to VQA configured to answer any question concerning images. Accordingly, it is possible to detect, for example, an anomaly state or a dangerous state of the worker. Furthermore, since a general format of images and questions is used, it is applicable to various situations and the accuracy in estimation of the state can be improved. Moreover, an answer to any question can be inferred by using the trained model relating to VQA. Therefore, even if the safety manual is revised, only the set of a question and an estimated answer needs be changed, and not the entire trained model. Accordingly, it is possible to achieve labor savings in maintenance of the state determination apparatus or check items.

Second Embodiment

The second embodiment differs from the first embodiment in that a question and an expected answer are automatically generated.

Figure 6:
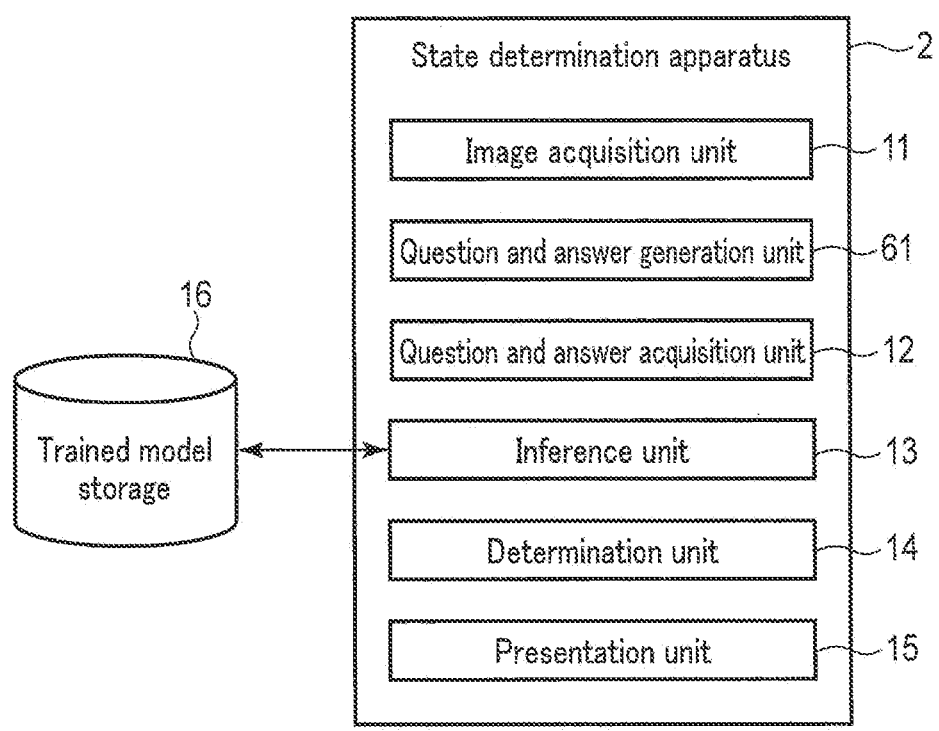
FIG. 6 is a block diagram showing a state determination apparatus according to a second embodiment.

A state determination apparatus according to the second embodiment will be explained with reference to the functional block diagram of FIG. 6.

A state determination apparatus 2 of the second embodiment includes an image acquisition unit 11, a question and answer acquisition unit 12, an inference unit 13, a determination unit 14, a presentation unit 15, and a question and answer generation unit 61.

The question and answer generation unit 61 receives a manual from outside, and generates a question and an expected answer corresponding to the question from the manual. The manual may be a work manual, such as a safety manual, a check list, or an instruction manual. It may also be a work report, a trouble report, or a knowledge graph or an ontology in which situations, causes, and remedial measures of past troubles are associated. For example, whether or not the current state meets conditions of a past trouble can be determined by generating a question and an expected answer on the basis of a trouble report.

As a method for generating a question and an expected answer from the manual, for example, it suffices to use a rule-base method, in which a negative sentence in the manual, such as "You cannot . . . " is converted to an interrogative sentence, such as "Can you . . . ?", thereby generating a questionary sentence and setting a sentence in the descriptions of the manual to be an expected answer. Alternatively, it suffices to use a template-base method, in which a template such as "<Conditions>, <Noun>+<Verb>" is prepared, and word classes and conditional sentences are extracted from the descriptions of the manual and applied to the template, thereby generating a questionary sentence and setting a sentence in the descriptions of the manual to be an expected answer. Thus, any method may be used to extract or generate a question and an expected answer from the manual.

The state determination apparatus 2 can determine a state by making an inference from an acquired image using the generated question and expected answer.

The question and answer generation unit 61 may generate a plurality of questions and expected answers corresponding to the questions from one determination item in the manual. In this case, a plurality of questions are variations to question one determination item from different angles. By generating a plurality of questions from one determination item, a certainty factor and robustness can be improved.

Figure 7:
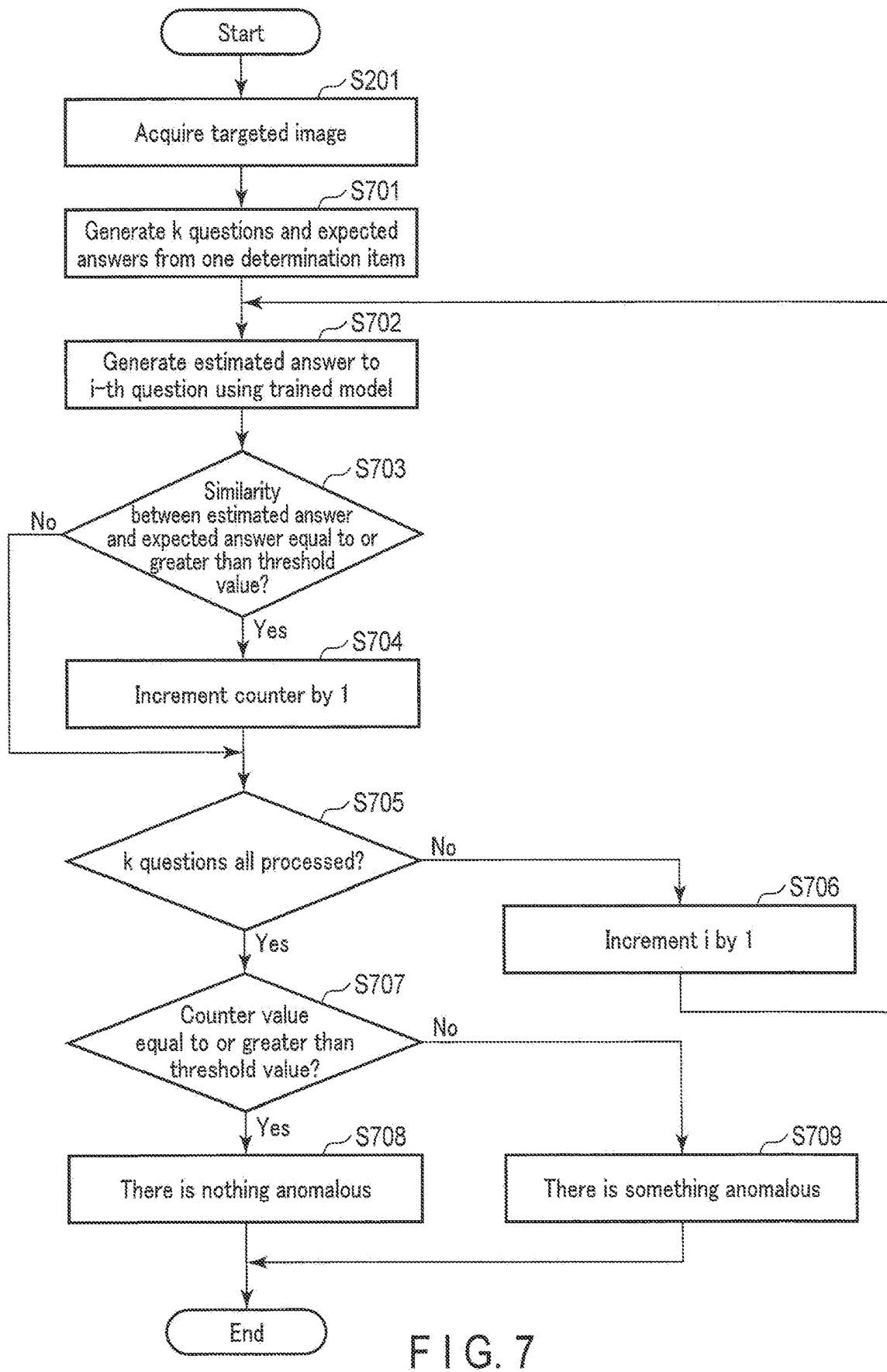
FIG. 7 is a flowchart showing a state determination process of the state determination apparatus according to the second embodiment.

The state determination process of the state determination apparatus 2 in the case of generating a plurality of questions from one determination item will be explained with reference to the flowchart of FIG. 7. Step S201 is the same as that shown in FIG. 2.

In step S701, the question and answer generation unit 61 generates k questions (k is a positive integer equal to or greater than 2) and corresponding expected answers from one determination item through the generation method as described above.

In step S702, the inference unit 13 generates an estimated answer to an i-th question (i is a positive integer equal to or greater than 1) using the trained model.

In step S703, the determination unit 14 determines whether or not the similarity between the estimated answer and the expected answer is equal to or greater than a threshold value. If the similarity is equal to or greater than the threshold value, the flow proceeds to S704. If the similarity is smaller than the threshold value, the flow proceeds to step S705.

In step S704, the determination unit 14 increments a counter by 1.

In step S705, the determination unit 14 determines whether the k questions generated in step S701 are all processed or not. If the k questions are all processed, the flow proceeds to step S707. If there is an unprocessed question, the flow proceeds to step S706.

In step S706, the number i is incremented by 1 to process the next question, and the flow returns to step S702. Then, the same process is repeated.

In step S707, the determination unit 14 determines whether the value of the counter is equal to or greater than a threshold value. If the value of the counter is equal to or greater than the threshold value, the flow proceeds to S708. If the value of the counter is smaller than the threshold value, the flow proceeds to step S709.

In step S708, since the determination unit 14 has acquired a given number of estimated answers conforming to the expected answers to the questions, it determines that there is nothing anomalous.

In step S709, since the determination unit 14 has not acquired estimated answers conforming to the expected answers, it determines that there is something anomalous.

In step S707, the determination unit 14 may determine that there is something anomalous, if the determination unit 14 acquires at least one estimated answer that is different from the expected answer by setting the threshold value to be the same as the number of questions, namely, k. As a result, conditions for determination can be strict.

According to the second embodiment described above, for example, to determine a check item as to whether there is an object in the pathway, variations of questions are generated for the one check item: "Is there no object in pathway?", "What is in pathway?", "How many objects are there in pathway?", etc. If the expected answers, such as "No", "Nothing", and "0", are generated for the respective questions, it is possible to determine that the state is dangerous when an estimated answer is different from the expected answers. Thus, the state can be determined under more strict conditions.

If the accuracy of the inference of the trained model is low, the state may be determined to be dangerous when estimated answers to questions of a given number or more are different from the expected answers, so that the robustness against an error of the estimated answers can be improved.

Even if the question and answer generation unit 61 is not used, if a plurality of questions and corresponding expected answers are prepared in advance for one determination item, the same determination result can be obtained by the state determination apparatus 1 according to the first embodiment.

In the above embodiment, whether there is anything anomalous is determined with respect to one scene (one image). However, if the situation in which the estimated answer is different from the expected answer lasts for a predetermined period or longer or occurs a predetermined number of times or more, it is possible to determine that there is something anomalous. Specifically, for example, a case is considered, in which a work of a worker is monitored through a monitoring camera, and the monitoring camera shows the worker alone performing a work that is required to be performed by a plurality of workers. Assume that the question "A plurality of workers perform the work?" and the expected answer "Yes" have been input to the state determination apparatus and the estimated answer "No" is output. In this case, the determination unit 14 may hold, for example, time information when the estimated answer "No" is output for the first time and thereafter the state determination apparatus may continue the determination process, and if the estimated answer "Yes" is output even after a predetermined time has elapsed since the first time information, the determination unit 14 may determine that there is something anomalous. As a result, it is possible to determine that the worker is in a dangerous state.

In the embodiment described above, determination of an anomaly state, in particular, sensing of a danger, is assumed. However, the embodiment is not limited to the above example, and a work skill can be detected by the state determination apparatus of the embodiment. For example, a question and an expected answer concerning a know-how of a work of an experienced worker are generated in advance, and the inference unit 13 generates an estimated answer based on an image of an operating worker. If the similarity between the expected answer and the estimated answer is smaller than a threshold, the determination unit 14 can determine that the work of the operating worker is different from the work of the experienced person, namely, the work is low-skilled.

If the work is determined to be low-skilled, the presentation unit 15 may present the matter to the worker by a notice through the user interface screen or a sound, or may present in what item the work is determined to be low-skilled. Furthermore, the presentation unit 15 may present to the worker an explanatory text or a moving image relating to a work of an experienced worker as a remedial measure. Thus, a low skill can be detected and specialized knowledge and skills of an experienced worker can be passed to the next generation through performing a state determination by the state determination apparatus using a question, an expected answer, a remedial measure, etc. prepared in advance.

Similarly, the state determination apparatus can detect a high-load work. For example, a question and an expected answer are generated in advance from Ovako Working Posture Analyzing System (OWAS) for a check item as to whether the load on the work which the worker is currently performing is equal to or lower than the standard. Then, the inference unit 13 generates an estimated answer based on an image of the operating worker. If the similarity between the expected answer and the estimated answer is smaller than a threshold, the determination unit 14 can determine that the load of the work of the operating worker is different from the standard load, namely, the work is a high-load work.

If the work is determined to be a high-load work, the presentation unit 15 may present the matter to the worker by a notice through the user interface screen or a sound, or may present in what item the work is determined to be high-load. In addition, an accumulated time of the work determined to be high-load may be calculated to calculate a degree of accumulative load. Accordingly, a high-load work can be detected, and work load distribution in a work site can be considered based on the detected result.

Furthermore, the state determination apparatus can detect a low-efficiency work. For example, a question and an expected answer concerning whether the work is efficient or not are generated in advance. Then, the inference unit 13 generates an estimated answer based on an image of the operating worker. If the similarity between the expected answer and the estimated answer is smaller than a threshold, the determination unit 14 can determine that the work of the operating worker is different from an efficient work, namely, the work is a low-efficiency work.

If the work is determined to be a low-efficiency work, the presentation unit 15 may present the matter to the worker by a notice through the user interface screen or a sound, or may present in what item the work is determined to be low-efficiency. In addition, an accumulated time of the work determined to be low-efficiency may be calculated to calculate an accumulative low-efficiency work time. Accordingly, a low-efficiency work can be detected, and productivity in a site of work can be improved.

Third Embodiment

The general VQA, which is also assumed to be the trained model of the first and second embodiments, utilizes information of a region of interest (ROI) in an object as a feature amount of an image. Therefore, an estimated answer to a question concerning an object, such as a person or a sign, is obtainable. However, with regard to a question concerning a non-object, such as a road or sky, it is difficult to generate a correct answer. The third embodiment described below relates to an image analysis apparatus including a configuration to detect a feature amount concerning a non-object.

Figure 8:
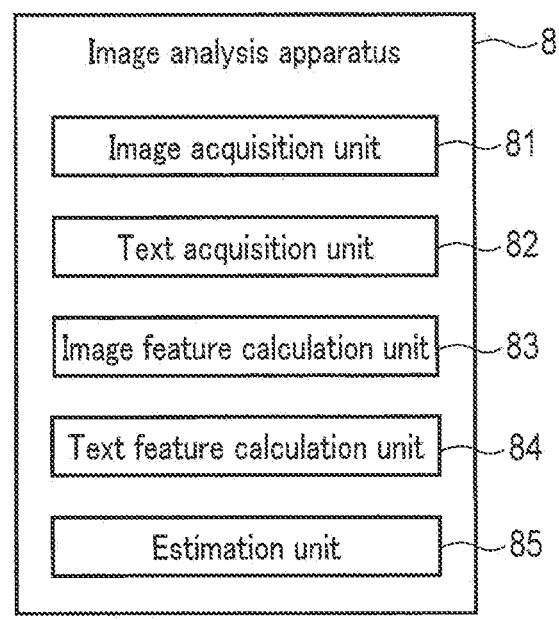
FIG. 8 is a block diagram showing an image analysis apparatus according to a third embodiment.

The image analysis apparatus according to the third embodiment will be explained with reference to the functional block diagram of FIG. 8.

An image analysis apparatus 8 of the third embodiment includes an image acquisition unit 81, a text acquisition unit 82, an image feature calculation unit 83, a text feature calculation unit 84, and an estimation unit 85.

The image acquisition unit 81 acquires a targeted image as a target for VQA processing.

The text acquisition unit 82 acquires a question to the targeted image acquired by the image acquisition unit 81.

The image feature calculation unit 83 calculates an image feature amount by combining a first image feature amount concerning an object from the image and a second image feature amount concerning a non-object from the image.

The text feature calculation unit 84 calculates a text feature amount from the question acquired by the text acquisition unit 82.

The estimation unit 85 estimates an answer to the question concerning the targeted image based on the image feature amount and the text feature amount.

Figure 9:
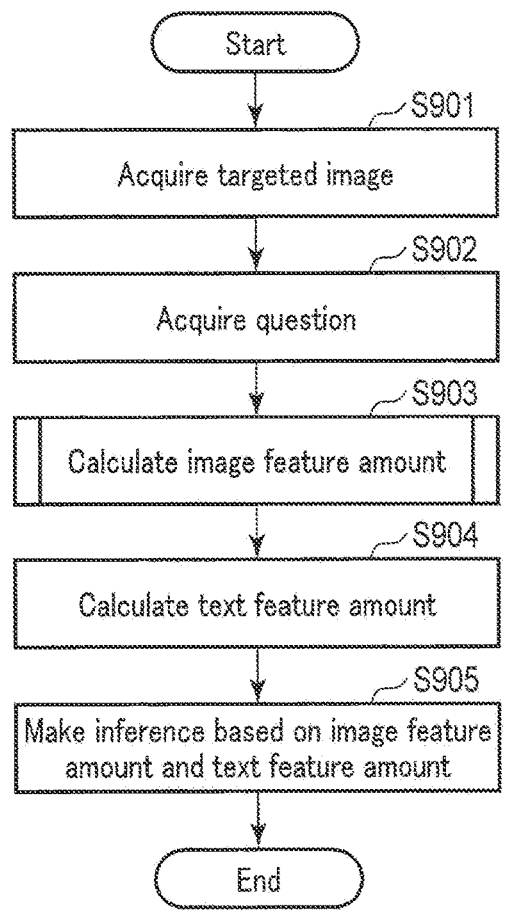
FIG. 9 is a flowchart showing an operation of the image analysis apparatus according to the third embodiment.

Next, an operation of the image analysis apparatus 8 according to the third embodiment will be described with reference to the flowchart of FIG. 9.

In step S901, the image acquisition unit 81 acquires an image.

In step S902, the text acquisition unit 82 acquires a question. The question concerns an image, for example, "Wear a cap?" and "Road congested?".

In step S903, the image feature calculation unit 83 calculates the first image feature amount and the second image feature amount from the image using, for example, a neural network. Thereafter, the image feature calculation unit 83 combines the first image feature amount and the second image feature amount, thereby calculating an image feature amount. The details of a method for calculating the image feature amount will be described later with reference to FIG. 11 and subsequent figures.

In step S904, the text feature calculation unit 84 calculates the text feature amount from the question. As the text feature amount, for example, a value obtained by vectorizing a text through a method that allows text embedding, such as Word2vec, may be used.

In step S905, the estimation unit 85 estimates an answer to the question using the image feature amount and the text feature amount with a trained model for VQA through, for example, a deep neural network (DNN) in which "an attention mechanism" is utilized. The trained model may be retained in the image analysis apparatus 8 or in an external storage like the trained model storage 16 shown in FIG. 1.

Step S901 to step S904 may be executed in any order, as long as the order of step S901 and step S903 and the order of step S902 and step S904 are fixed. For example, the steps may be executed in the order of acquisition of a targeted image, calculation of an image feature amount, acquisition of a question, and calculation of a text feature amount.

Figure 10:
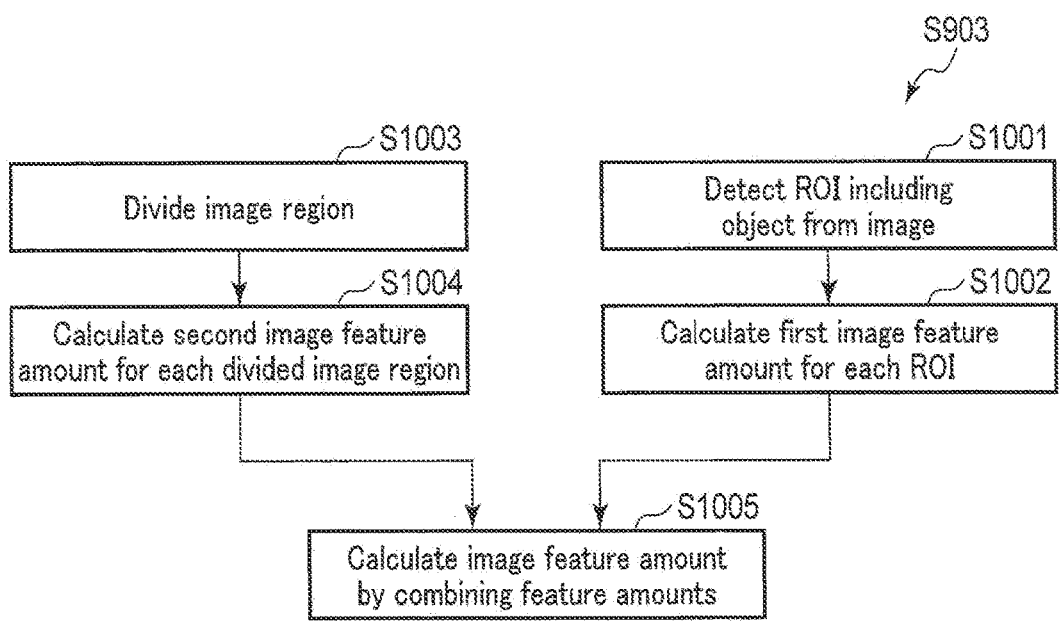
FIG. 10 is a flowchart showing a first example of an image feature amount calculation process.

A first example of the process of calculating an image feature amount of the image feature calculation unit 83 in step S903 will now be described with reference to the flowchart of FIG. 10.

In step S1001, the image feature calculation unit 83 detects a ROI including an object from the targeted image acquired in step S901.

In step S1002, the image feature calculation unit 83 calculates a feature amount of the extracted ROI as the first image feature amount.

In step S1003, the image feature calculation unit 83 divides an image region through a semantic segmentation process from the image acquired in step S901.

In step S1004, the image feature calculation unit 83 calculates a feature amount relating to the semantic segmentation as the second image feature amount for each divided image region.

In step S1005, the image feature calculation unit 83 calculates an image feature amount by combining the first image feature amount calculated in step S1002 and the second image feature amount calculated in step S1004. As a combining method, if the first image feature amount and the second image feature amount are respectively represented by vectors, it suffices to combine the vectors with each other.

Next, an example of calculation of the first image feature amount in step S1001 and step S1002 will be described with reference to FIG. 11.

Figure 11:
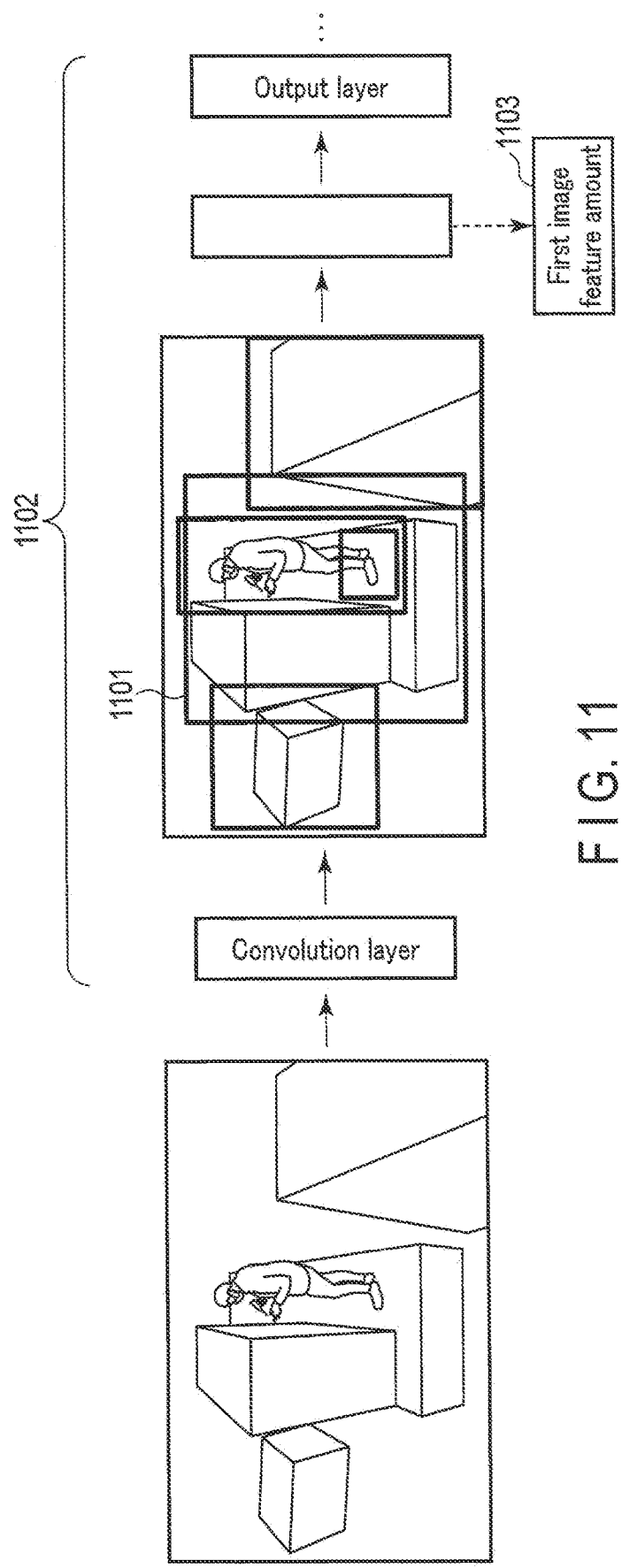
FIG. 11 is a conceptual diagram showing an example of calculation of a first image feature amount.

FIG. 11 is a conceptual diagram showing a flow of calculation of the first image feature amount from the image. In the third embodiment, it is assumed that a neural network called Faster R-CNN is used as an object detecting model. The left part of FIG. 11 shows an image of the target for processing, which is assumed to be an image obtained by photographing a situation in which a worker is performing a work. The object detecting model is not limited to Faster R-CNN, and may be any object detecting model in general.

The image is input to a convolution layer of an object detecting model 1102. In the object detecting model 1102, rectangular shapes (bounding boxes) respectively surrounding objects, such as a worker and a shelf, are expressed as ROI 1101 so as to specify regions that appear as objects. For each ROI, a feature amount relating to the object in the ROI is extracted. In an object recognition model in general, a candidate for the object and an identification vector (identification score) are output from the object recognition model. In the third embodiment, a value calculated in a preceding layer just before an output layer is set as a first image feature amount (ROI feature amount) 1103. For example, with regard to a ROI to be processed, when an identification vector including an identification score relating to 80 candidates for objects (namely 80-dimensional vector) is obtained from the output layer, the vector of 80 dimensions or more, for example, 2000 dimensions or more, has been processed before the output layer. In the present embodiment, a vector value calculated in the preceding layer just before the output layer is used as the first image feature amount 1103.

As the first image feature amount 1103 concerning the ROI, information on a scene graph representing a positional relation between objects and a semantic relation between the objects may be used.

Next, an example of calculation of the second image feature amount in step S1003 and step S1004 will be described with reference to FIG. 12.

Figure 12:
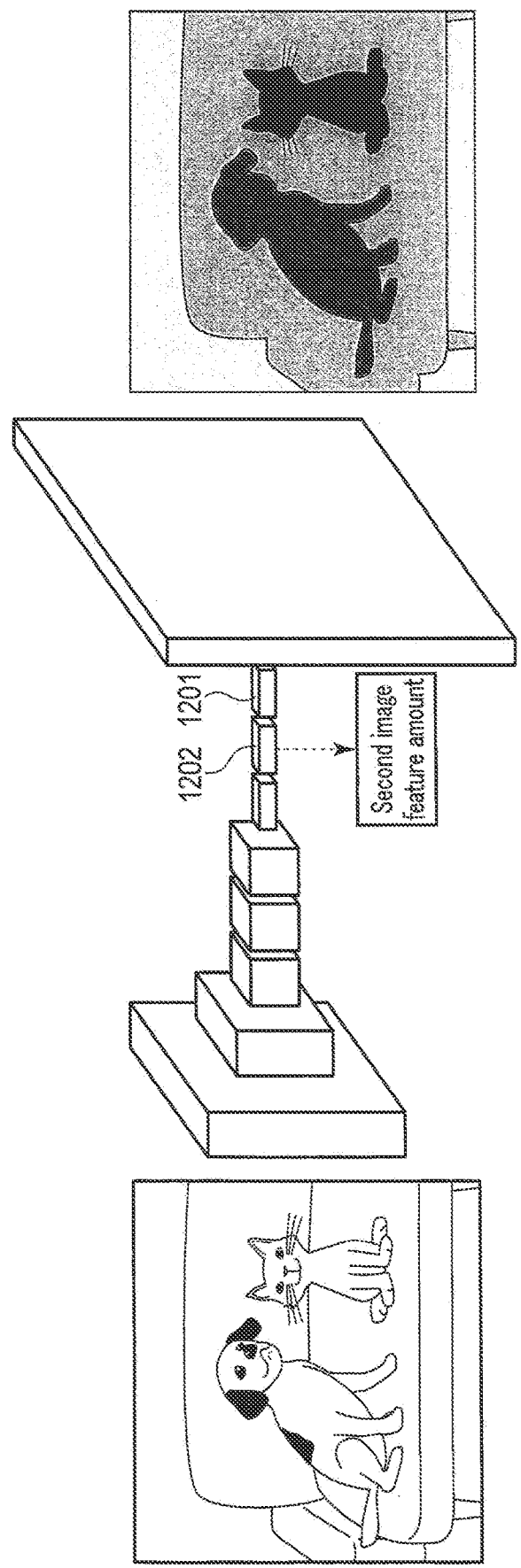
FIG. 12 is a conceptual diagram showing an example of calculation of a second image feature amount.

FIG. 12 is a conceptual diagram showing a fully convolutional network (FCN) as an example of a semantic segmentation model used in the third embodiment. Any model other than the FCN, for example, SegNet or U-net, is applicable to the embodiment, as long as the model can be used for semantic segmentation.

The left part of FIG. 12 shows an image example of the target for processing, in which a dog and a cat are present on a sofa. In the semantic segmentation, labeling is performed for each pixel of the image. According to the third embodiment, the divided image regions obtained by step S1003 respectively correspond to, for example, silhouette regions of a dog, a cat, a sofa, and a background in the right part of FIG. 12. With regard to pixels included in the image region, the image feature calculation unit 83 calculates a vector value (for example, a 4000-dimensional vector) calculated in a preceding layer 1202 just before an output layer 1201 is set as the second image feature amount concerning the image region.

A second example of the process of calculating an image feature amount of the image feature calculation unit 83 will now be described with reference to the flowchart of FIG. 13. The processes in step S1001 and step S1003 are the same as those in FIG. 10.

In step S1301, the image feature calculation unit 83 generates a combined ROI by combining the ROI obtained in step S1001 with an image region obtained in step S1003. In the generation of the combined ROI, for example, the sum of the ROI detected in step S1001 and the image region obtained in step S1003 is referred to as a combined ROI.

For example, the threshold to recognize a ROI may be lowered to detect ROIs of a greater number than usual in step S1001 for detecting ROT, and a ROI, in which an overlap region of the detected ROI and the image region obtained in step S1003 is equal to or greater than a threshold value, may be generated as a combined ROI.

In step S1302, the image feature calculation unit 83 calculates an image feature amount for each combined ROI. In step S1302, the feature amount may be calculated in the same manner as calculated through the object detecting model in step S1002.

Figure 14:
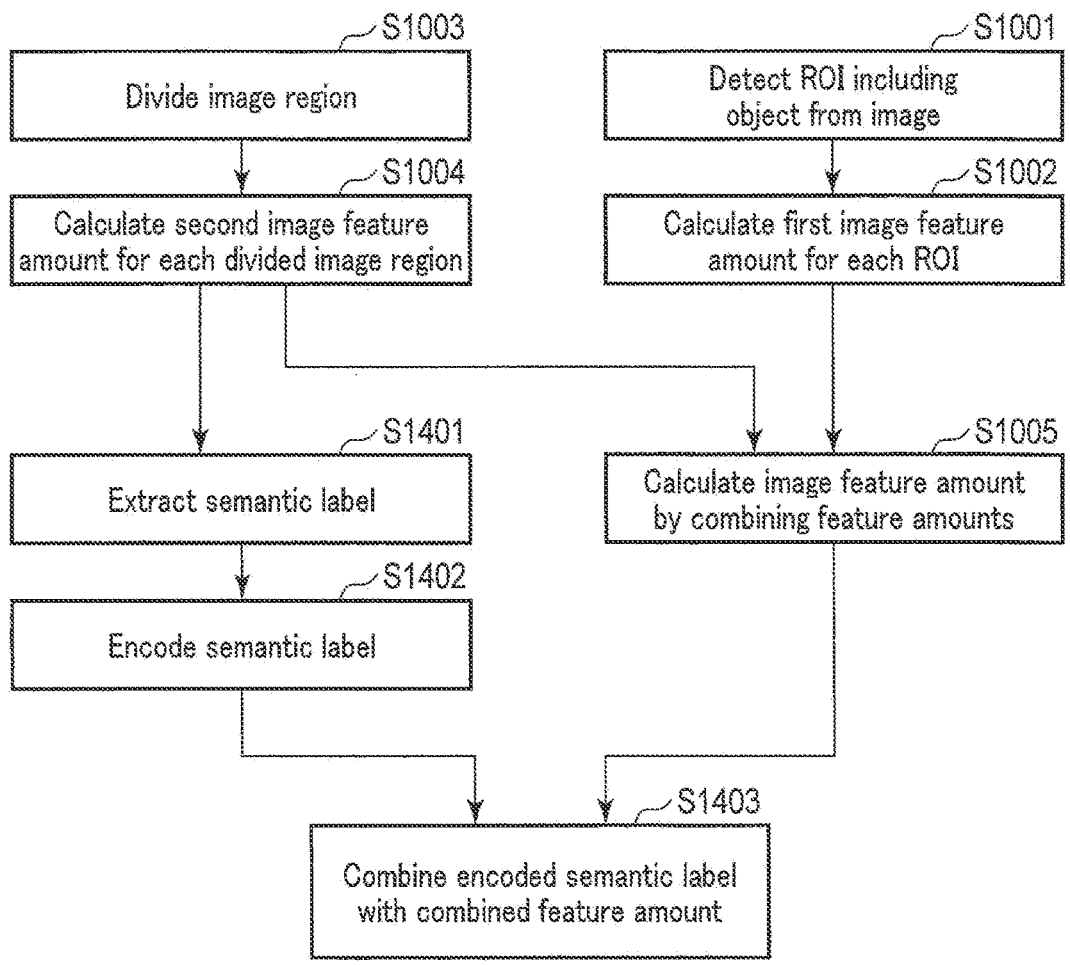
FIG. 14 is a flowchart showing a third example of the image feature amount calculation process.

A third example of the process of calculating an image feature amount of the image feature calculation unit 83 will now be described with reference to the flowchart of FIG. 14.

In step S1401, the image feature calculation unit 83 extracts a semantic label of each image region. The semantic label is a label applied to a divided image region obtained by semantic segmentation, such as a label "dog" or a label "cat" in the example of FIG. 12.

In step S1402, the image feature calculation unit 83 encodes a semantic label. For example, the semantic label may be vectorized by using Word2vec.

In step S1403, the image feature calculation unit 83 combines the image feature amount obtained in step S1005 and the encoded semantic label obtained in step S1402. For example, the vector of the image feature amount may be combined with the vector of the encoded semantic label.

According to the third embodiment described above, the VQA problem is addressed by the trained model in which the feature amounts concerning non-object, background, etc. are trained as feature amounts of the image. Accordingly, an answer can be estimated for any question concerning not only an object but also a non-object, a background, or the like, so that the performance of VQA can be improved. As a result, the accuracy in estimation can be improved.

The inference unit 13 of the state determination apparatus of the first and second embodiments can be replaced by the image analysis apparatus according to the third embodiment. Accordingly, an answer to any question concerning a non-object or a background, for example, "Any object dropped on a road?", can be estimated, so that the estimation accuracy of the state can be improved.

Figure 15:
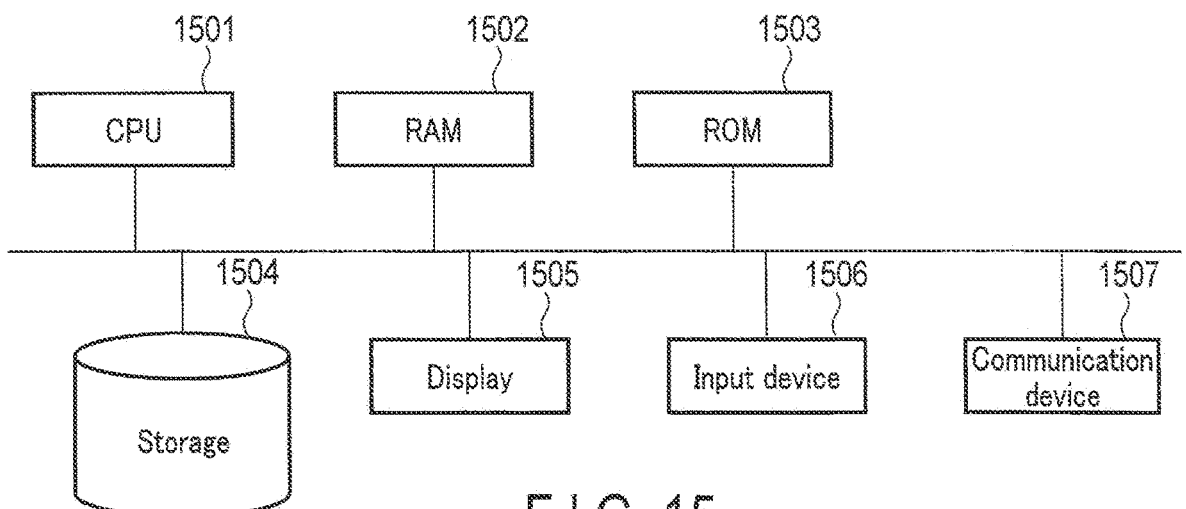
FIG. 15 is a diagram showing an example of a hardware configuration of a state determination apparatus or an image analysis apparatus.

FIG. 15 shows an example of a hardware configuration of the state determination apparatus or the image analysis apparatus according to the embodiment.

The state determination apparatus or the image analysis apparatus includes a central processing unit (CPU) 1501, a random access memory (RAM) 1502, a read only memory (ROM) 1503, a storage 1504, a display 1505, an input device 1506, and a communication device 1507, all of which are connected by a bus.

The CPU 1501 is a processor that executes a calculation process and a control process in accordance with programs. The CPU 1501 executes various processes using a predetermined area of the RAM 1502 as a work area in cooperation with programs stored in the ROM 1503, the storage 1504, etc. For example, The CPU 1501 executes functions relating to each unit of the state determination apparatus or the image analysis apparatus.

The RAM 1502 is a memory, such as a synchronous dynamic random access memory (SDRAM). The RAM 1502 functions as a work area of the CPU 1501. The ROM 1503 is a memory storing programs and various information in a non-rewritable manner.

The storage 1504 is a device that writes and reads data in and from a magnetic recording medium, such as a hard disc drive (HDD), a semiconductor storage medium, such as a flash memory, a magnetically recordable storage medium, such as an HDD, or an optically recordable storage medium. The storage 1504 writes and reads data in and from the storage medium under the control of the CPU 1501.

The display 1505 is a display device, such as a liquid crystal display (LCD). The display 1505 displays various information based on a display signal from the CPU 1501.

The input device 1506 is an input device, such as a mouse and a keyboard. The input device 1506 receives information input via user operations, and outputs an instruction signal to the CPU 1501.

The communication device 1507 communicates with an external device through a network under the control of the CPU 1501.

The instructions included in the steps described in the foregoing embodiments can be implemented based on a software program. A general-purpose computer system may store the program beforehand and read the program in order to attain the same effects as those of the control operations of the state determination apparatus and the image analysis apparatus described above. The instructions in the embodiments described above are stored in a magnetic disc (flexible disc, hard disc, etc.), an optical disc (CD-ROM, CD-R, CD-RW, DVD-ROM, DV±R, DVD±RW, Blu-ray (registered trademark) disc, etc.), a semiconductor memory, or a similar storage medium, as a program executable by a computer. As long as the storage medium is readable by a computer or by a built-in system, any storage format can be used. Operations similar to those of the state determination apparatus and the image analysis apparatus of the embodiment described above can be realized if the computer reads a program from the storage medium, and executes the instructions written in the program on the CPU based on the program. The computer may, of course, acquire or read the program by way of a network.

In addition, an operating system (OS) working on a computer, database management software, middleware (MW) of a network, etc. may execute a part of the processing to realize the embodiments based on instructions of a program installed from a storage medium onto a computer and a built-in system. Furthermore, the storage medium according to the embodiments is not limited to a medium independent from a system or a built-in system, and may include a storage medium storing or temporarily storing a program downloaded through a LAN or the Internet, etc.

Furthermore, the number of storage mediums is not limited to one. The embodiments include the case where the processing is executed by means of a plurality of storage media, and the storage media can take any configuration.

The computer or built-in system in the present embodiments are used to execute each processing in the embodiments, based on a program stored in a storage medium, and the computer or built-in system may be an apparatus consisting of a PC, a microcomputer or the like, or may be a system or the like in which a plurality of apparatuses are connected through a network.

The computer adopted in the embodiments is not limited to a PC; it may be a calculation processing apparatus, a microcomputer, or the like included in an information processor, and a device and apparatus that can realize the functions of the embodiments by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A state determination apparatus comprising a processor configured to:
    acquire a targeted image;
    acquire, from among a plurality of stored questions and associated expected answers, a question concerning the targeted image and an expected answer to the question;
    generate an estimated answer estimated with respect to the question concerning the targeted image using a trained model trained to estimate an answer based on a question concerning an image; and
    determine whether a state of a determination target is a normal state or an anomalous state, based on a similarity between the expected answer and the estimated answer,
    wherein the expected answer assumes the normal state, and the processor determines that the determination target is in the anomalous state when the similarity is smaller than a threshold.

2. The apparatus according to claim 1, wherein when the determination target is in the anomalous state, the processor determines that the determination target is in a dangerous state.

3. The apparatus according to claim 1, wherein the processor is further configured to:
    refer to a database in which the question is associated with a solution when the determination target is determined to be in the anomalous state; and
    present the solution.

4. The apparatus according to claim 1, wherein the processor is further configured to extract and generate the question and the expected answer to the question from a manual.

5. The apparatus according to claim 1, wherein:
    the processor is further configured to generate a plurality of sets of questions and associated expected answers with respect to one determination item assuming a normal state in a manual, and
    the processor determines that the determination item is in an anomalous state when a number of sets is smaller than a second threshold value, the number of sets being a number of times that a similarity between the expected answer and the estimated answer generated by using the trained model with respect to each of the questions is equal to or greater than a first threshold value.

6. The apparatus according to claim 1, wherein the trained model is a model relating to visual question answering (VQA).

7. The apparatus according to claim 1, wherein when a situation in which the similarity is smaller than a threshold value lasts for a predetermined period or longer or occurs a predetermined number of times or more, the processor determines that the determination target is in the anomalous state.

8. A state determination apparatus comprising a processor configured to:
    acquire a targeted image;
    acquire, from among a plurality of stored questions and associated expected answers, a question concerning the targeted image and an expected answer to the question;
    generate an estimated answer estimated with respect to the question concerning the targeted image using a trained model trained to estimate an answer based on a question concerning an image; and
    determine a state of a determination target based on a similarity between the expected answer and the estimated answer,
    wherein the expected answer assumes an anomalous state, and the processor determines that the determination target is in the anomalous state when the similarity is equal to or greater than a threshold value.

9. An image analysis apparatus comprising a processor configured to:
    acquire an image;
    acquire a question pertaining to the image from among a plurality of stored questions;
    detect a region of interest (ROI) in the image;
    calculate a first image feature amount relating to the detected ROI;
    divide the image into image regions through a semantic segmentation process;
    calculate a second image feature amount with respect to each divided image region;
    calculate an image feature amount from the image by combining the first image feature amount and the second image feature amount;
    calculate a text feature amount representing a semantic content of the question; and
    estimate an answer to the question based on the image feature amount and the text feature amount.

10. The apparatus according to claim 9, wherein the processor is configured to:
    generate a combined ROI by combining the detected ROI and a divided image region; and
    calculate the image feature amount with respect to the combined ROI.

11. The apparatus according to claim 10, wherein the processor calculates, as the combined ROI, a sum of the detected ROI and the divided image region.

12. The apparatus according to claim 10, wherein the processor calculates, as the combined ROI, an ROI in which an overlap region between the detected ROI and the divided image region is equal to or greater than a threshold value.

13. The apparatus according to claim 9, wherein:
    the first image feature amount and the second image feature amount are represented as vectors; and
    the processor combines a vector of the first image feature amount and a vector of the second image feature amount.

14. The apparatus according to claim 9, wherein the processor combines the image feature amount with a feature amount based on a label applied to a divided image region obtained through the semantic segmentation process.

15. The apparatus according to claim 9, wherein the processor extracts information on a scene graph representing a positional relation between objects and a semantic relation between the objects, and calculates the image feature amount by combining the information on the scene graph and the second image feature amount.

16. A state determination apparatus comprising a processor configured to:
    acquire a targeted image;
    acquire, from among a plurality of stored questions and associated expected answers, a question concerning the targeted image and an expected answer to the question;
    generate an estimated answer estimated for the question concerning the targeted image using the image analysis apparatus according to claim 9; and determine a state of a determination target based on a similarity between the expected answer and the estimated answer.

\* \* \* \* \*